(12) United States Patent
Yung et al.

(10) Patent No.: US 8,331,618 B1
(45) Date of Patent: Dec. 11, 2012

(54) METHOD AND APPARATUS FOR MONITORING INSTANT MESSAGING WITH VISUAL IDENTIFICATION

(75) Inventors: Pak Wai Yung, Los Angeles, CA (US); Jung-Eun Choi, Fullerton, CA (US); Abubakar Wawda, Los Angeles, CA (US)

(73) Assignee: Symantec Corporation, Mountain View ( * ) Notice: Subject to any disclaimer, the term of this patent is extended or adjusted under 35 U.S.C. 154(b) by 816 days.

(21) Appl. No.: 12/336,227

(22) Filed: Dec. 16, 2008

(51) Int. Cl.
*G06K 9/00* (2006.01)
*G06F 15/173* (2006.01)
*H04H 60/33* (2008.01)

(52) U.S. Cl. .............................. 382/103; 709/224; 725/9

(58) Field of Classification Search .................. None
See application file for complete search history.

(56) References Cited

U.S. PATENT DOCUMENTS

| | | | |
|---|---|---|---|
| 6,111,517 A | 8/2000 | Atick et al. | |
| 7,194,536 B2 * | 3/2007 | Fellenstein et al. | 709/224 |
| 7,974,616 B1 * | 7/2011 | Urbanek | 455/423 |
| 8,217,790 B2 * | 7/2012 | Script | 340/566 |
| 2005/0044143 A1 * | 2/2005 | Zimmermann et al. | 709/204 |
| 2006/0167849 A1 | 7/2006 | Marcus et al. | |
| 2006/0239645 A1 * | 10/2006 | Curtner et al. | 386/95 |
| 2008/0192129 A1 * | 8/2008 | Walker et al. | 348/231.2 |

OTHER PUBLICATIONS

"Information & Reviews of Top IM Monitoring Software to Record IMs & Secretly Read Chats," downloaded from web site http://www.monitoringsoftwarereviews.org/?e=1&kw=im+monitoring&s_kwcid=im%20monitoring|758552975&gclid=CJyi4rrDwpQCF-QVcswodDCpCUA on Mar. 20, 2009.
Tao, Ji and Tan, Yap-Peng, "People Monitoring Using Face Recognition with Observation Constraints," International Conference on Image Processing, 2004 (ICIP '04), vol. 3, Oct. 24-27, 2004, pp. 1437-1440.
"PJSUA-API Buddy, Presence, and Instant Messaging," downloaded from web site http://www.pjsip.org/pjsip/docs/html/group_PJSUA_LIB_BUDDY.htm on Mar. 20, 2009.
"Visual Friend Identification," downloaded from web site http://ejohn.org/blog/visual_friend_id on Mar. 20, 2009.

* cited by examiner

*Primary Examiner* — Andrew W Johns
*Assistant Examiner* — David F Dunphy
(74) *Attorney, Agent, or Firm* — Wilmer Cutler Pickering Hale and Dorr LLP

(57) ABSTRACT

Method and apparatus for monitoring instant messaging with visual identification are described. In some examples, monitoring of instant message (IM) traffic at a node on a network is performed. Video content in the IM traffic is detected at the node. A facial recognition analysis is performed on the video content to extract at least one image having human facial features. At least one user identity is extracted from the IM traffic. The at least one image and the at least one user identity are stored in a log implemented in a memory on the network.

23 Claims, 3 Drawing Sheets

METHOD AND APPARATUS FOR MONITORING INSTANT MESSAGING WITH VISUAL IDENTIFICATION

BACKGROUND OF THE INVENTION

1. Field of the Invention

The present invention relates generally to computer network traffic analysis. More particularly, the present invention relates to a method and apparatus for monitoring instant messaging with visual identification.

2. Description of the Related Art

Children often communicate with their friends and family members using instant messaging (IM) software, such as YAHOO Instant Messenger, MSN LIVE MESSENGER, America Online (AOL) Instant Messenger, and the like. There are concerns, however, that children can be lured into messaging with child predators. Hence, parental control applications exist that provide parents or guardians with a list of IM "buddies" with which a child communicates, as well as their conversation logs. However, such parental control products do not provide any type of visual identification of each buddy or other user with which a child communicates. As such, a child predator or other potentially dangerous individual may masquerade under a seemingly innocuous buddy or user name, going unnoticed by the parent or guardian receiving reports from the parental control product. For example, a child can have a buddy named "happy_girl" and a parent or guardian will not know whether "happy_girl" is actually a young girl or a child predator pretending to be a young girl.

Accordingly, there exists a need in the art for a method and apparatus for visually identifying buddies or users with which a child communicates using IM software.

SUMMARY OF THE INVENTION

Aspects of the invention relate to monitoring instant message (IM) traffic at a node on a network. Video content in the IM traffic is detected at the node. A facial recognition analysis is performed on the video content to extract at least one image having human facial features. At least one user identity is extracted from the IM traffic. The at least one image and the at least one user identity are stored in a log implemented in a memory on the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
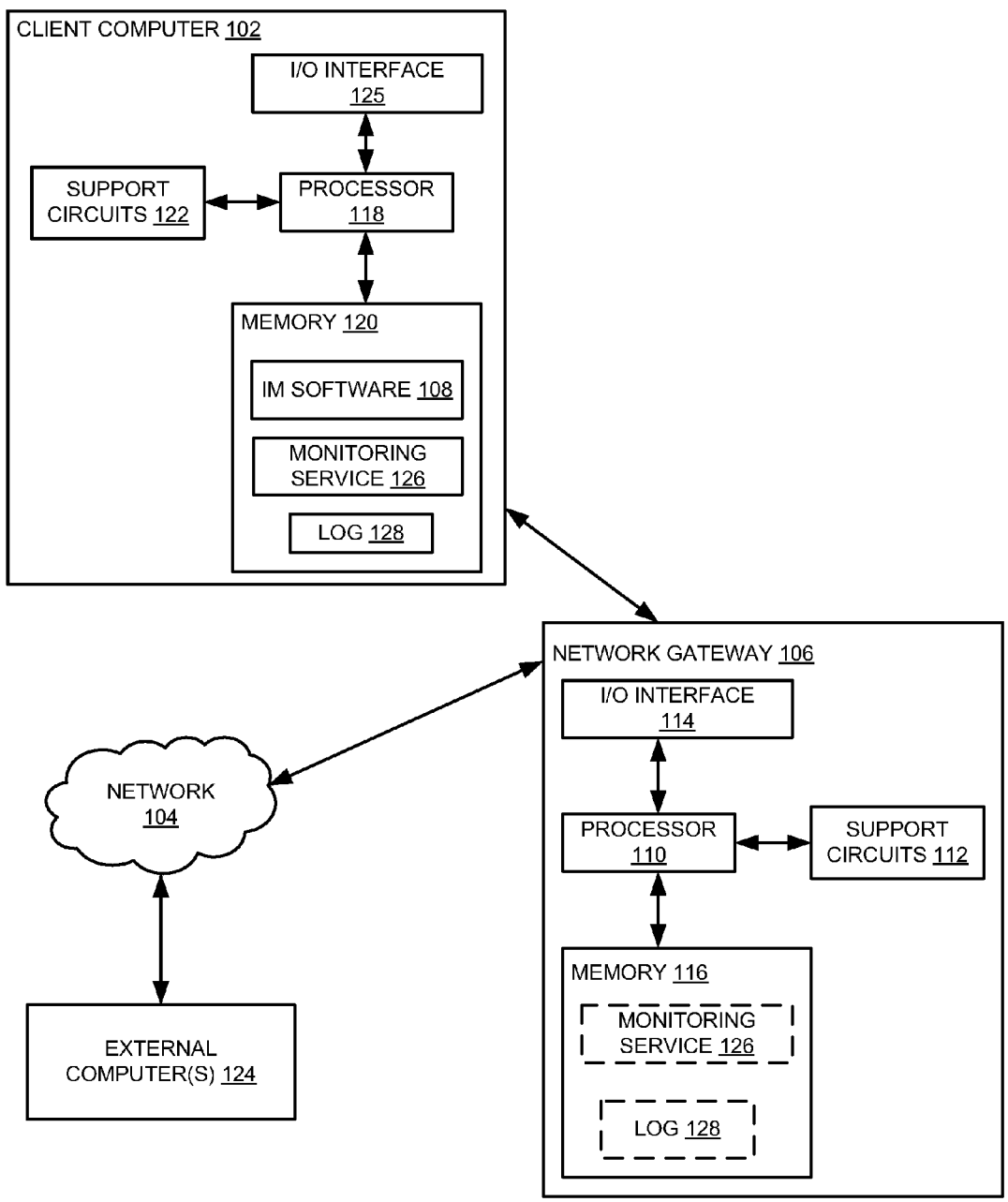
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes a client computer 102, a network 104, and a network gateway 106. The network 104 comprises a communication system that connects computer systems by wire, cable, fiber optic, and/or wireless links facilitated by various types of well-known network elements, such as hubs, switches, routers, and the like. In particular, the client computer 102 is coupled to the network 104 through the network gateway 106. The client computer 102 may communicate with other external computers 124 coupled to the network 104 (e.g., web servers on the Internet). The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN). Although only a single client computer 102 is shown for purposes of clarity by example, it is to be understood that the system 100 may include additional client computers coupled to the network gateway 106.

The client computer 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

The client computer 102 includes instant messaging (IM) software 108. The IM software 108 may comprise software executable by the client computer 102 to exchange messages with other computers (e.g., external computers 124) on the network 104. The IM software 108 generally sends and receives IM traffic over the network 104. Exemplary IM software includes YAHOO Instant Messenger, AMERICA ONLINE Instant Messenger, MSN LIVE MESSENGER, and APPLE ICHAT. The IM software 108 cooperates with an IM service (typically provided by the distributor of the IM software 108) that maintains a set of users with user identities (sometimes referred to as "handles"). A user of the client computer 102 (referred to as the user being monitored) can employ the IM software 108 to log into the IM service under a particular user identity. The user of the client computer 102 can then send messages to other user identities. The IM software 108 can maintain a list of user identities referred to as "buddies". The messages may include text, audio, and/or video. Notably, the IM software 108 may be configured to initiate video sessions between user identities where the IM traffic includes at least one video stream.

The network gateway 106 is configured to provide an interface between the client computer 102 and various other computers on the network 104 (e.g., external computers 124). The network gateway 106 illustratively includes a processor 110, a memory 116, various support circuits 112, an I/O interface 114. The processor 110 may include one or more microprocessors known in the art. The support circuits 112 for the processor 110 include conventional cache, power supplies, clock circuits, data registers, I/O interfaces, and the like. The I/O interface 114 may be configured for communication with the network 104. The memory 116 may include one or more of the following random access memory, read only memory, magneto-resistive read/write memory, optical read/write memory, cache memory, magnetic read/write memory, and the like.

The system 100 includes a monitoring service 126. The monitoring service 126 is configured to monitor IM traffic initiated by the client computer 102. For example, the monitoring service 126 may be implemented as parental control software in which a parent, guardian, or supervisor can monitor instant messaging by a child, minor, or other person being supervised. In some embodiments, the monitoring service 126 is implemented by the client computer 102. For example, the monitoring service 126 may be implemented as standalone program or as part of a larger suite of parental control programs. The monitoring service 126 can monitor the IM traffic locally on the client computer 102. In some embodiments, the monitoring service 126 is implemented by the network gateway 106. In such case, the monitoring service 126 can monitor the IM traffic on the client computer 102 remotely. In some embodiments, the monitoring server 126 may be implemented by another computer on the network 104 (e.g., an external computer 124). For example, a remote server can be configured as a proxy through which the IM traffic to and from the computer 102 is directed. In still other embodiments, the monitoring service 126 may be implemented across multiple network nodes, including the client computer 102, the network gateway 106, and/or external computers 124.

In general, the monitoring service 126 is implemented on a node in the network 104, which may be the client computer 102 or the network gateway 106. In some embodiments, the monitoring service 126 comprises software configured for execution by a processor on the respective node to cause the node to process network traffic. While the monitoring service 126 is described as being software executed by a computer, it is to be understood that the monitoring service 126 may be implemented using hardware (e.g., via an application specific integrated circuit (ASIC) or programmable logic device (PLD), or a combination of hardware and software.

Figure 2:
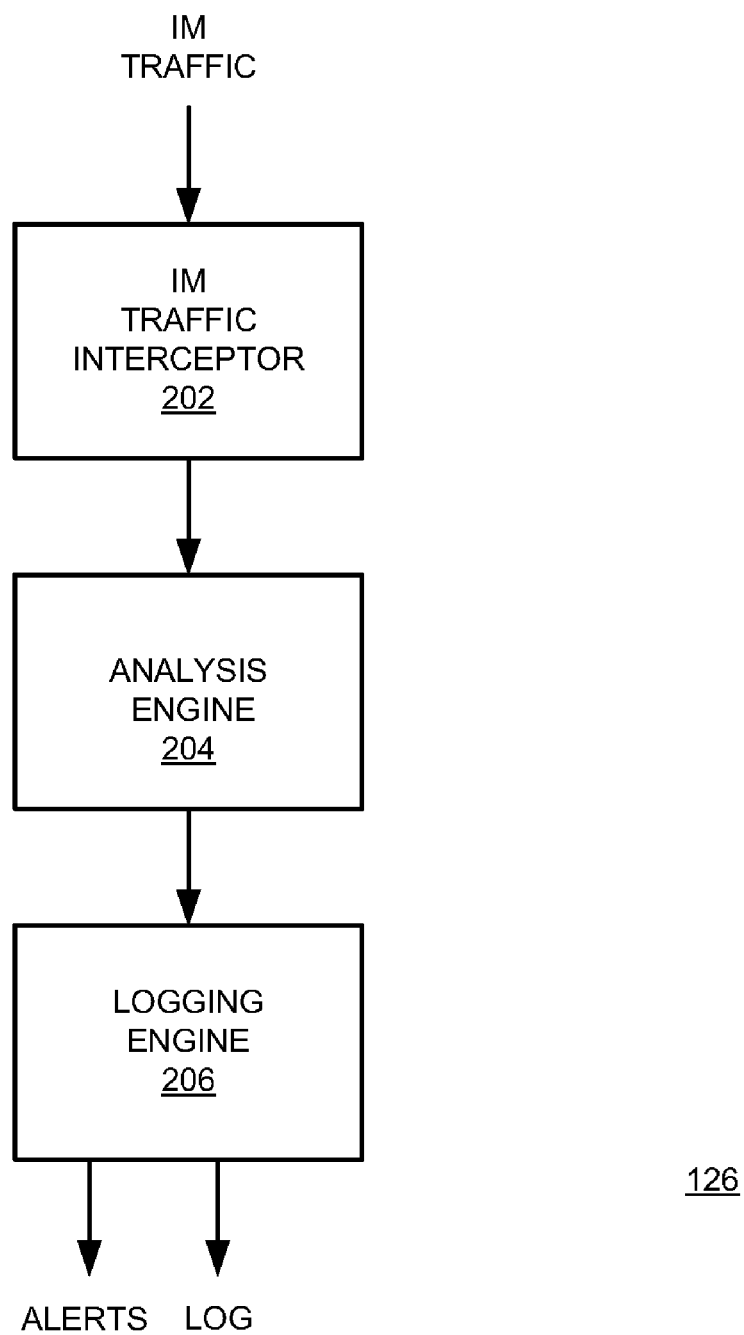
FIG. 2 is a block diagram depicting a monitoring service according to some embodiments of the invention.

FIG. 2 is a block diagram depicting the monitoring service 126 according to some embodiments of the invention. The monitoring service 126 includes an IM traffic interceptor 202, an analysis engine 204, and a logging engine 206. The IM traffic interceptor 202 is configured to intercept IM traffic traversing the network 104 to and from the client computer 102. In some embodiments, the IM traffic interceptor 202 is configured to intercept a particular subset of IM traffic, such as IM traffic associated with a particular user identity being monitored (e.g., a child). That is, the client computer 102 may include multiple users, each of which logs into the IM software 108 under a different user identity. The IM traffic interceptor 202 may be configured to intercept IM traffic for some user identities (e.g., children users), while ignoring IM traffic from other user identities (e.g., parent users) in order to avoid unnecessary processing. The IM traffic interceptor 202 can obtain the IM traffic by monitoring well-known transmission control protocol (TCP) ports used for the purpose of instant message transmissions.

The analysis engine 204 is configured to detect video content in the IM traffic captured by the IM traffic interceptor 202. The video content may include one or more video streams having any well known format. The analysis engine 204 is further configured to perform a facial recognition analysis on the video content to extract at least one image having human facial features. For example, the video content may be separated into one or more video streams, and each of the video streams may be associated with a particular user identity (i.e., a particular user with which the user(s) being monitored is/are messaging). The facial recognition analysis may extract one or more images having human facial features from each video stream in the video content. That is, the facial recognition analysis can obtain image(s) for each unique user identity with which the user(s) being monitored is/are messaging. In some embodiments, the analysis engine 204 may use open-source libraries for implementing the facial recognition analysis, such as FACETRAKER or BLACKSUN. Notably, the facial recognition analysis is not required to match a face to a known face. Rather, the analysis is only required to isolate frames considered to include human facial features.

In some embodiments, for each video stream in the video content, the facial recognition analysis may extract multiple images. The analysis engine 204 may select the best one of the multiple images. Selection of a best image may be based on at least one metric defined by the facial recognition analysis. For example, the facial recognition analysis may generate a score for each image of human facial features. The analysis engine 204 may select the image having the highest score as the best image from that particular video stream.

The analysis engine 204 is further configured to extract one or more user identifies from the IM traffic captured by the IM traffic interceptor 202. The user identities refer to users with whom the monitored user(s) have messaged. For message sessions having a video stream, the analysis engine 204 may relate a user identity with the image captured by the facial recognition process. The analysis engine 204 then provides image(s) and user identities to the logging engine 206.

The logging engine 206 is configured to store the image(s) and the user identities in a log 128 (see FIG. 1). The log 128 may be implemented in a memory on the network 104, such as the memory 120 in the client computer 102 or the memory 116 in the network gateway 106. In some embodiments, the log 128 may be implemented in a memory of another node or computer on the network 104 (e.g., external computer 124). That is, the log 128 may be hosted by a remote server with respect to the client computer 102 and the network gateway 106. The log 128 may be analyzed to inspect instant messaging activity by users of the client computer 102. For example, a parent, guardian, or supervisor can inspect instant messaging activity by a child, minor, or other person being supervised that uses the client computer 102. Since the log 128 may include an image associated with each user identity, the person inspecting the log 128 can have a visual identification of users with which the person being monitored is messaging. In case the log 128 is stored on a remote server (e.g., an external computer 124), the parent, guardian, or supervisor can view the log 128 from any computer coupled to the network 104 by logging into the remote server (e.g., over a web interface).

In some embodiments, the logging engine 206 is further configured to send an alert message over the network to a pre-defined address. In some embodiments, the alert message is an e-mail message sent to a particular e-mail address. For example, a parent or administrator may register his or her e-mail address with the monitoring service 126, and the logging engine 206 may send any alerts to such e-mail address. The alert message can include the log 128 or a portion of the log 128 (e.g., newly identified users with which there was no previous messaging along with their images). In some embodiments, if the log 128 is maintained remotely at a remote server (e.g., external computer 124), then the alert messages may be sent from the remote server.

Figure 3:
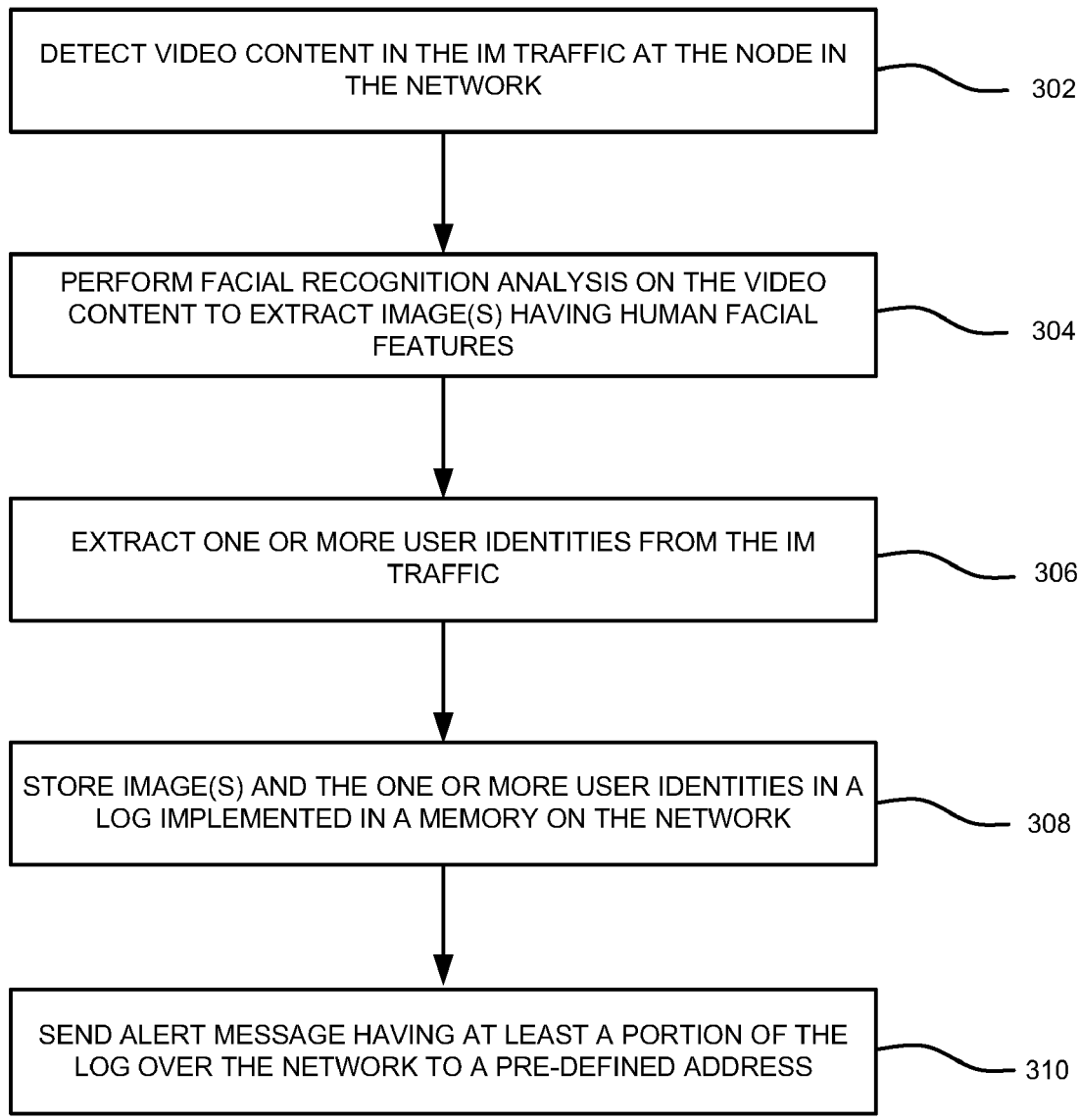
FIG. 3 is a flow diagram depicting a method of monitoring instant messaging (IM) traffic at a node on a network according to some embodiments of the invention.

FIG. 3 is a flow diagram depicting a method 300 of monitoring IM traffic at a node on a network according to some embodiments of the invention. The method 300 begins at step 302, where video content in the IM traffic is detected at the node in the network. At step 304, a facial recognition analysis is performed on the video content to extract one or more images having human facial features. Exemplary facial recognition analyses are described above with respect to the analysis engine 204. At step 306, one or more user identities is/are extracted from the IM traffic. At step 308, the image(s) and one or more user identities are stored in a log implemented in a memory on the network. At an optional step 310, an alert message having at least a portion of the log is sent over the network to a pre-defined address.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method of monitoring instant message (IM) traffic at a node on a network, comprising:
   detecting video content in the IM traffic at the node;
   performing a facial recognition analysis on the video content to extract an image having human facial features;
   extracting a user identity from the IM traffic;
   associating the image having human facial features with the user identity to provide a visual identification for the user identity;
   sending an alert message having the associated image and the user identity to a pre-defined address; and
   storing the associated image and the user identity in a log implemented in a memory on the network.

2. The method of claim 1, wherein the node comprises a client computer configured with IM software that generates and receives the IM traffic.

3. The method of claim 1, wherein the node comprises a gateway in communication with a client computer configured with IM software that generates and receives the IM traffic.

4. The method of claim 1, wherein the IM traffic includes messaging between a user being monitored and another user, and wherein the video content includes a video stream originating from the other user.

5. The method of claim 4, wherein the image includes a best one of a plurality of images from the video stream based on at least one metric defined by the facial recognition analysis.

6. The method of claim 5, wherein the user identity comprises an identity of the other user, and wherein the best image is associatively stored with the identity of the other user in the log.

7. The method of claim 6, wherein the alert message sent to the pre-defined address comprises the best image and the identity of the other user.

8. The method of claim 1, further comprising:
   sending an alert message having at least a portion of the log over the network to a pre-defined address.

9. An apparatus for monitoring instant message (IM) traffic at a node on a network, comprising:
   means for detecting video content in the IM traffic at the node;
   means for performing a facial recognition analysis on the video content to extract an image having human facial features;
   means for extracting a user identity from the IM traffic;
   means for associating the image having human facial features with the user identity to provide a visual identification for the user identity;
   means for sending an alert message having the associated image and the user identity to a pre-defined address; and
   means for storing the associated image and the user identity in a log implemented in a memory on the network.

10. The apparatus of claim 9, wherein the node comprises a client computer configured with IM software that generates and receives the IM traffic.

11. The apparatus of claim 9, wherein the node comprises a gateway in communication with a client computer configured with IM software that generates and receives the IM traffic.

12. The apparatus of claim 9, wherein the IM traffic includes messaging between a user being monitored and another user, and wherein the video content includes a video stream associated with the other user.

13. The apparatus of claim 12, wherein the image includes a best one of a plurality of images from the video stream based on at least one metric defined by the facial recognition analysis.

14. The apparatus of claim 13, wherein the user identity comprises an identity of the other user, and wherein the best image is associatively stored with the identity of the other user in the log.

15. The apparatus of claim 14, wherein the alert message sent to the pre-defined address comprises the best image and the identity of the other user.

16. The apparatus of claim 9, further comprising:
   means for sending an alert message having at least a portion of the log over the network to a pre-defined address.

17. A non-transitory computer readable medium having instructions stored thereon that when executed by a processor cause the processor to perform a method of monitoring instant message (IM) traffic at a node on a network, comprising:
   detecting video content in the IM traffic at the node;
   performing a facial recognition analysis on the video content to extract an image having human facial features;
   extracting a user identity from the IM traffic;
   associating the image having human facial features with the user identity to provide a visual identification for the user identity;
   sending an alert message having the associated image and the user identity to a pre-defined address; and
   storing the associated image and the user identity in a log implemented in a memory on the network.

18. The non-transitory computer readable medium of claim 17, wherein the node comprises a client computer configured with IM software that generates and receives the IM traffic.

19. The non-transitory computer readable medium of claim 17, wherein the node comprises a gateway in communication with a client computer configured with IM software that generates and receives the IM traffic.

20. The non-transitory computer readable medium of claim 17, wherein the IM traffic includes messaging between a user being monitored and another user, and wherein the video content includes a video stream associated with the other user.

21. The non-transitory computer readable medium of claim 20, wherein the image includes a best one of a plurality of images from the video stream based on at least one metric defined by the facial recognition analysis.

22. The non-transitory computer readable medium of claim 21, wherein the user identity comprises an identity of the other user, and wherein the best image is associatively stored with the identity of the other user in the log.

23. The non-transitory computer readable medium of claim 22, wherein the alert message sent to the pre-defined address comprises the best image and the identity of the other user.

* * * * *